United States Patent Office 3,007,346
Patented Nov. 7, 1961

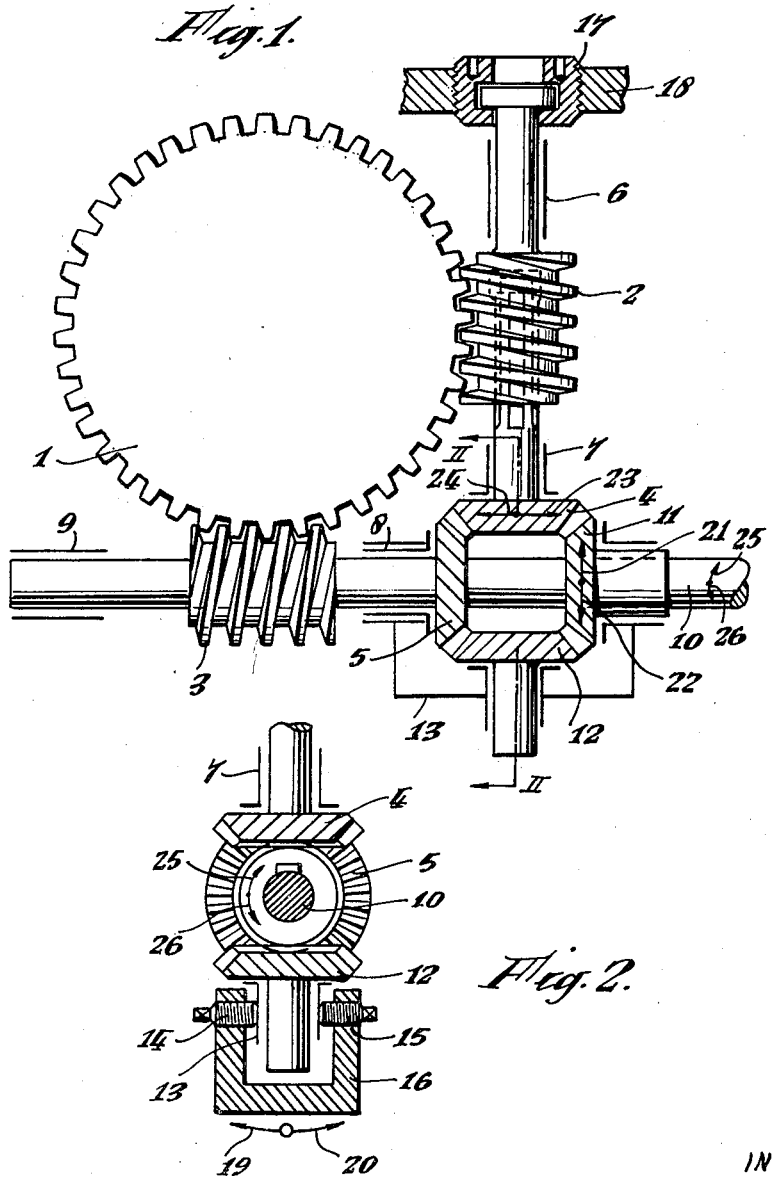

3,007,346
COMPENSATING DEVICE FOR TABLE DRIVES IN GEAR-MACHINING MACHINES
Walter Demuth, Wallisellen, Switzerland, assignor to Maag Gear Wheel & Machine Company, Limited, Zurich, Switzerland
Filed Dec. 7, 1959, Ser. No. 857,600
Claims priority, application Switzerland Dec. 10, 1958
3 Claims. (Cl. 74—427)

This invention relates to compensating devices for table drives in gear-machining machines having a worm wheel which is driven by two worms, the two worms being connected together by intermeshing bevel gears, the object being to provide improvements therein.

A gear-cutting machine is already known in which the work table is driven by a plurality of drives operating in parallel, compensating devices being provided between the drives, whereby the driving forces are distributed uniformly among the individual drives and irregularities produced in the rotary movement of the workpiece by inaccurate form of the drives are eliminated. The transmission backlash, on the contrary, is not compensated. This transmission backlash in the drive of the two worms can, however, make itself felt in a very unpleasant manner, in that, according to the nature of the stress, the right-hand or left-hand flanks of the transmission bevel gears come into contact during the gear-machining process. Since a certain transmission backlash in the bevel gears must always be accepted, it is important to control this backlash by adjustment.

According to the invention, this is accomplished in that the said two bevel gears also mesh with two other bevel gears which in turn mesh with each other, and that one of the said other bevel gears is adapted to swing about the axis of the two bevel gears with which it meshes, and the transmission backlash is compensated by the said swinging action.

Furthermore, a method of compensating pitch errors in a gear-milling or shaping machine is known in which the driving member producing the movement of the workpiece or tool, as well as of the worm driving the index gear, the lead screw moving the milling head, or any member driven from said drive, is given an additional movement which is determined on the basis of the pitch errors, but is not axial, and which counteracts the effect of these errors and entirely or partly eliminates it. A device for carrying out this known method has an intermediate gearing of four bevel gears, two of the said bevel gears being mounted in a frame rotatable about the shaft axis and controlled by an eccentric, non-circular disc or the like, the said eccentric or non-circular disc being driven off the worm shaft by means of a reduction gearing. This kind of bevel gearing and its swingability, however, imparts an additional movement to the workpiece table, and does not serve to compensate the transmission backlash.

A device also is known for compensating the lost motion in machine gearing, wherein, in addition to the main drive for the driven part, an auxiliary drive is provided which tends to give the driven part a greater velocity than the main drive, the excess of driving velocity of the auxiliary drive being compensated by a flexible member incorporated in the auxiliary drive. In this case, however, some of the power of the flexible member is converted into heat which must be regarded as a disadvantage.

The device according to the present invention does not suffer from the disadvantages of the known devices referred to hereinbefore.

One embodiment of the invention is shown diagrammatically in the accompanying drawings, by way of example, wherein:

FIG. 1 shows the compensating mechanism, looking in the direction of the axis of the table of a gear-shaping machine; and FIG. 2 is a section on line II—II of FIG. 1.

A worm wheel 1 is rigidly connected to a rotatable workpiece table of a gear-cutting machine operating according to the generating method, which machine is not shown more particularly but is known per se. The worm wheel 1 is driven by two worms 2 and 3, which are connected together by intermeshing bevel gears 4 and 5. The shaft of the bevel gear 4 is axially slidable in the worm 2, but is connected thereto, for example by splines, so as to prevent relative rotation. The shaft of the worm 2 is mounted in a bearing 6, whilst the shaft of the bevel gear 4 is mounted in a bearing 7, the two said shafts being aligned axially. The shaft 10, on which the bevel gear 5 and the worm 3 are mounted rigidly, is mounted in two bearings 8 and 9. The shaft 10 is driven by a gearing, not shown, and is held against axial movement by a thrust bearing or other means, also not shown. Meshing with the bevel gear 4 is a bevel gear 11 which is mounted, relatively rotatable, on the shaft 10. A fourth bevel gear 12 meshes with the two bevel gears 5 and 11, the shaft of the bevel gear 12 being mounted in a rocker 13 which is adapted to swing on the shaft 10 about the common axis of the two bevel gears 5 and 11. The angular movement or swing of the rocker 13 is effected by two set screws 14 and 15, which are rigidly connected to the machine bed 18 through a support 16. Furthermore, a thrust bearing 17 for the shaft of the worm 2 is mounted in the machine bed 18 by means of a screw thread so that the position of the bearing in the machine bed can be adjusted axially of the said shaft.

For a better understanding of the function of the compensating mechanism, the shaft 10 and hence also the worm 3 can be imagined to be held fast against rotation. If, in this condition, the rocker 13 (FIG. 2), on the assumption of left-handed worms 2 and 3, is swung, by adjustment of the screws 14 and 15, in the direction of the arrow 20, then the bevel gear 12 rolls on the bevel gear 5, imagined to be held fast against rotation, and rotates the bevel gear 11 in the direction of the arrow 24 (FIG. 1) until the tooth flank backlash or the transmission backlash between the bevel gears 4 and 5 has been entirely or practically eliminated.

In the case of the flank backlash or play between the bevel gears 4 and 5 being relatively large, it may happen that in the rotation of the bevel gear 4 in the direction of the arrow 24, the flanks of the bevel gears 4 and 5 do not make contact with each other, but the worm 2 will rotate the worm wheel 1 in the clockwise direction (FIG. 1) until the left-hand flanks of the worm wheel 1 bear against the right-hand flanks of the worm 3, and the left-hand (or lower) flanks of the worm 2 bear against the right-hand (or upper) flanks of the worm wheel 1 as shown in FIG. 1.

If, under the same assumption, the rocker 13 is swung in the opposite direction, that is, in the direction of the arrow 19 (FIG. 2), the bevel gears 11 and 4 then rotate in the directions of the arrows 21 and 23, respectively, the flanks on the worm wheel 1 and on the worms 2 and 3, which are opposite to those in contact in the condition shown in FIG. 1, then coming into contact with each other. The same effects also occur if the shaft 10 of the worm 3 is allowed to rotate.

However, it will seldom occur that the tooth flank play between the bevel gears 4 and 5 is so large that, by means of the operation described in the preceding paragraph, that is, by the swinging movement of the rocker 13 alone, the worm wheel 1 will engage the two worms 2 and 3 without backlash. It is therefore expedient that axial adjustment of the worm 2 be effected by means of the adjusting bearing 17 so that the tooth flank backlash of the worm wheel 1 between one flank of the worm 2 and the opposite flank of the worm 3 is adjusted to a minimum or practically to zero. After this axial adjustment of the worm 2 by means of the adjusting bearing 17 it is possible to adjust, eliminate or compensate the tooth flank backlash or transmission backlash between the two bevel gears 4 and 5 on the right-hand or left-hand flanks. Preferably, the tooth flank backlash of the bevel gears 4 and 5 on their right-hand tooth flanks will be compensated to approximately zero when the principal direction of rotation, that is to say, the working direction of rotation of the drive, rotates the shaft 10 in the direction of the arrow 26 (FIG. 2). In the working direction of rotation of the shaft 10 according to the arrow 25, the left-hand flanks of the bevel gears 4 and 5 should be appropriately adjusted for transmitting a drive from the shaft 10 and the bevel gear 5 in the shortest way, that is, directly on to the bevel gear 4, since in the reverse direction of rotation the drive would be transmitted from bevel gear 5 by way of bevel gears 12 and 11 to the bevel gear 4; the consequence of the latter would be that any very small gear errors would have a more unfavourable effect because of the three transmission points between the bevel gears 5, 12, 11, 4, than there would be in the former case where there is only one transmission point between the bevel gears 4 and 5.

By suitable adjustment of the adjusting bearing 17, it is possible to eliminate or adjust the play, not only between the worms 2 and 3 and the worm wheel 1 by turning the rocker 13, but also at the same time between the two bevel gears 4 and 5.

Compensation of the irregularities of the transmission movements can be effected in known manner by suitable distribution of the engagements of the two worms relatively to the common worm wheel, since by limiting the backlash in the transmission mechanism the transmission element remaining is relieved of load.

In a modification of the invention, the set screws 14 and 15 are used as stops, and the swinging of the rocker 13, and hence also of the bevel gear 12, is effected by manually or power operated means. In this way, it is possible to control, in a predetermined manner, the transmission backlash in the bevel gears 4, 5, 11, 12 and/or from the worms 2 and 3 on to the worm wheel 1. Preferably, this control is effected automatically in accordance with the direction of movement of the mechanism, or of the drive on to the shaft 10 and in accordance with the speed of the drive. In this way it is possible, for example for roughing and finishing, to provide different transmission backlashes or clearances, or, for high speed, to increase the transmission backlash to an extreme value. Thereby it is also possible, according to the direction of rotation, to change the limited transmission backlash from one set of flanks to the other; in that case, the stops need not be limited to two only.

What I claim and desire to secure by Letters Patent is:

1. A compensating device for a table drive in a gear cutting machine having a worm wheel comprising two worm gears for driving said wheel, two intermeshing bevel gears operatively connecting said worm gears, two additional intermeshing bevel gears meshing with said first mentioned bevel gears, means for mounting one of said additional bevel gears to swing about the axis of the two bevel gears with which it meshes and adjustable stops for said swinging gear so that transmission backlash is compensated by the swinging of said swingingly mounted gear.

2. A compensating device as set forth in claim 1 wherein means are provided for axially adjusting one of said worm gears to adjust said worm gear to the swinging of said swingingly mounted gear in order to control play between said worm wheel and said two worm gears.

3. A compensating device as set forth in claim 1 wherein one of said worm gears is fixed upon a shaft and the other of said worm gears is axially adjustable upon a second shaft.

References Cited in the file of this patent
UNITED STATES PATENTS

| 1,274,918 | Maag | Aug. 6, 1918 |
| 1,472,848 | Maag | Nov. 6, 1923 |
| 1,848,044 | Blood | Mar. 1, 1932 |

FOREIGN PATENTS

| 562,158 | France | Dec. 6, 1923 |
| | (1st add. to 26,937) | |
| 616,342 | Great Britain | Jan. 2, 1949 |